United States Patent
Frohlich

(10) Patent No.: US 7,298,950 B2
(45) Date of Patent: Nov. 20, 2007

(54) DISTRIBUTION CABINET FOR OPTICAL FIBERS

(75) Inventor: Franz-Friedrich Frohlich, Hagen (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/572,448

(22) PCT Filed: Sep. 4, 2004

(86) PCT No.: PCT/EP2004/009890

§ 371 (c)(1),
(2), (4) Date: Mar. 17, 2006

(87) PCT Pub. No.: WO2005/036231

PCT Pub. Date: Apr. 21, 2005

(65) Prior Publication Data

US 2007/0058917 A1    Mar. 15, 2007

(30) Foreign Application Priority Data

Sep. 17, 2003  (DE) .............................. 103 43 270

(51) Int. Cl.
*G02B 6/00*   (2006.01)

(52) U.S. Cl. ..................................... 385/135; 385/134

(58) Field of Classification Search ................ 385/134, 385/135, 136, 137
See application file for complete search history.

(56) References Cited

U.S. PATENT DOCUMENTS

| | | | |
|---|---|---|---|
| 5,093,887 A | 3/1992 | Witte | 385/135 |
| 5,787,219 A * | 7/1998 | Mueller et al. | 385/134 |
| 6,097,872 A | 8/2000 | Kusuda et al. | 385/134 |
| 6,311,008 B1 * | 10/2001 | Foss | 385/135 |

FOREIGN PATENT DOCUMENTS

WO   WO02/05002   1/2002

* cited by examiner

*Primary Examiner*—Brian Healy
*Assistant Examiner*—Hung Lam
(74) *Attorney, Agent, or Firm*—Keith A. Roberson

(57) ABSTRACT

The invention relates to a distribution cabinet (10) for optical fibers, comprising a housing (11) and a frame (18) that is pivotally mounted inside the housing (11). Cables encompassing optical fibers that are guided therein can be routed into and/or directed out of the distribution cabinet, the cables being routed to the frame (18) from a rear side (14) of the housing (11) and being routed away from the frame in the direction of the rear side. Subassemblies are fastened to the frame (18) in order to connect the optical fibers that are guided within the cables. At least one holding device (23) for the cables is fastened to the pivotally mounted frame (18), the cables being fixable to the holding device (23). The holding device (23) is configured so as to be pivotable relative to the housing (11) along with the frame (18), while also being pivotable relative to the frame (18).

12 Claims, 3 Drawing Sheets

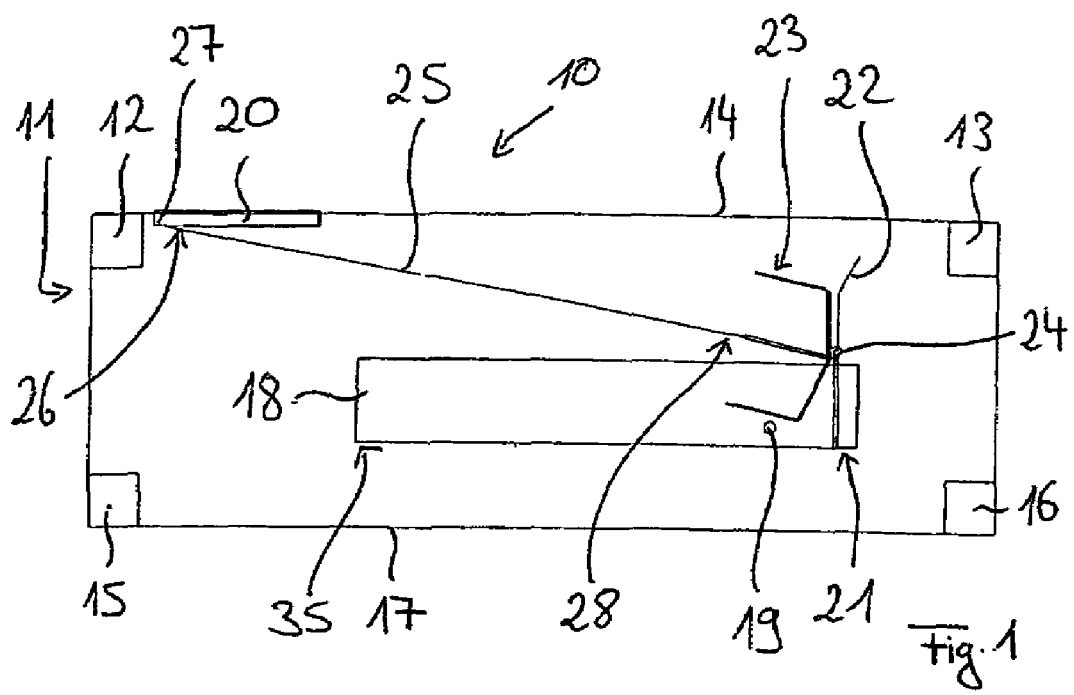
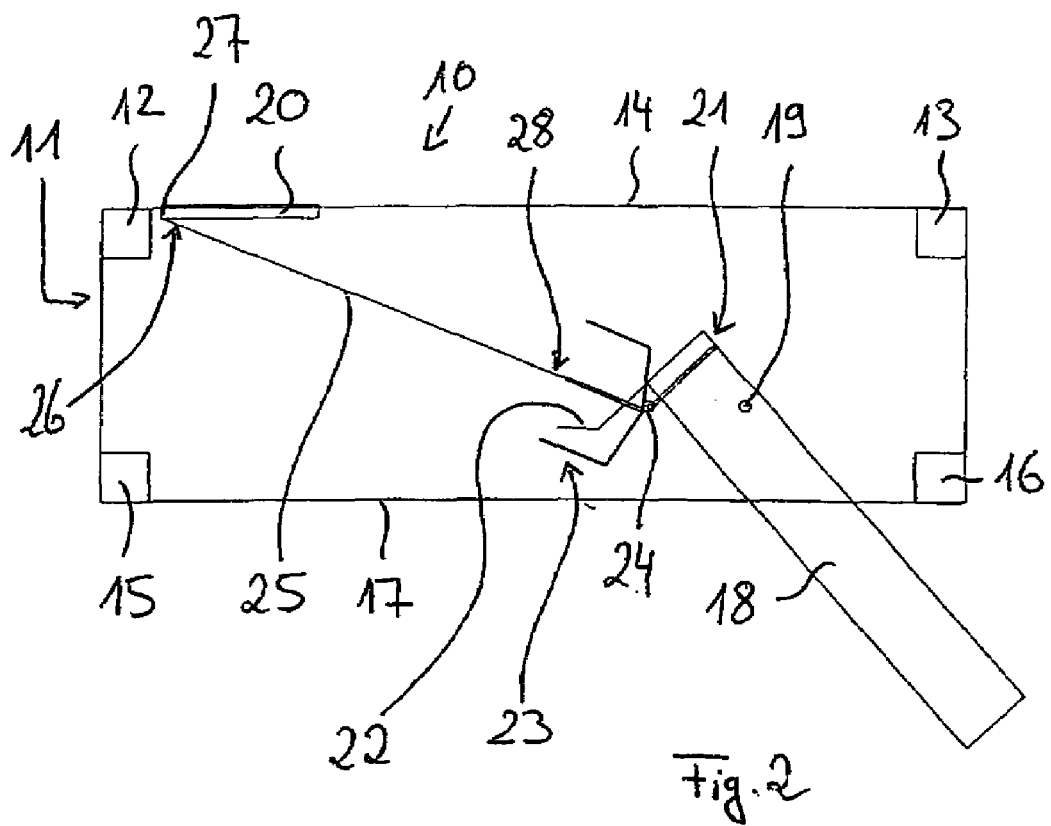

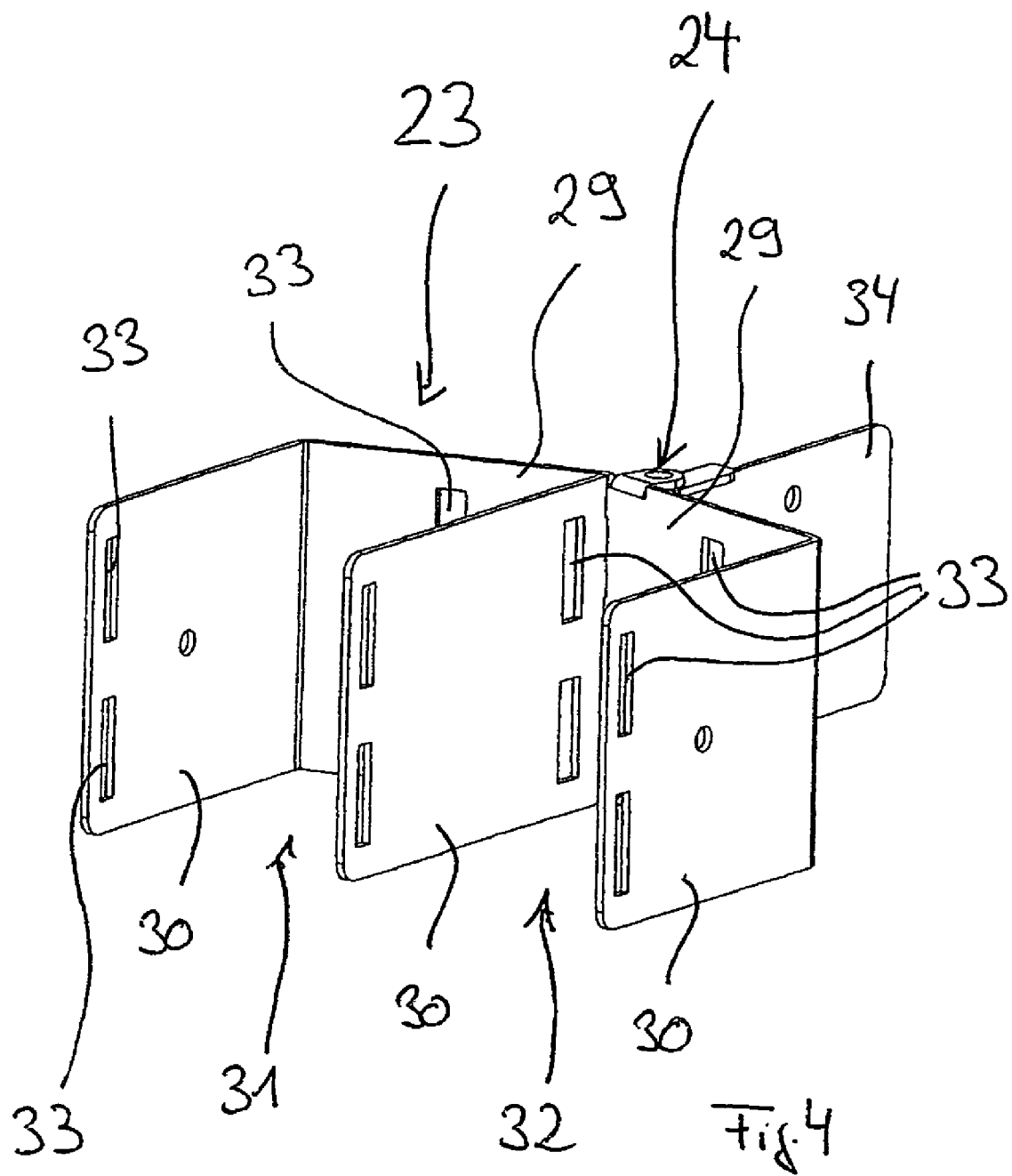

DISTRIBUTION CABINET FOR OPTICAL FIBERS

This National stage application claims the benefit of International Application No. PCT/EP04/009890, filed on Sep. 4, 2004, which claims the benefit of German Patent Application No. 10343270.1, filed on Sep. 17, 2003, and which was not published in the English language under PCT Article 21(2).

FIELD OF THE INVENTION

The present invention relates to a distribution cabinet for optical fibers.

BACKGROUND OF THE INVENTION

Distribution cabinets are required when designing optical fiber cable networks in order to ensure the cables are arranged in a structured fashion. One requirement made of distribution cabinets for optical fibers is that they be equipped to the maximum extent with a high packing density and at the same time little mechanical load on the optical fibers.

The prior art discloses distribution cabinets for optical fibers in which assemblies for connecting optical fibers which are routed by means of patch cables are arranged, such that they can pivot, in a frame which can pivot in relation to a housing of the distribution cabinet. In distribution cabinets for optical fibers of this type, the cables are routed into the distribution cabinet for from an upper face and/or a lower face of the housing in the region of a rear face of the housing and from the rear face of the housing to the pivotable frame. According to the prior art, the cables are in this case attached firstly in a region of the rear face of the housing and secondly to the pivotable frame. In the case of distribution cabinets for optical fibers of this type, the frame is pivoted in relation to the housing or out of the housing in order to gain access to the rear face of the assemblies which are accommodated in the frame. When the frame is pivoted, the cables are also moved and mechanically loaded since they are fixed to the frame. On account of the cables being rigidly fixed to the pivotable frame in the manner customary according to the prior art, the cables are bent, compressed or even twisted, and this often leads to the optical transmission properties of the optical fibers which run in the cables being impaired. In addition, a mechanical force is exerted on the frame on account of the cables being rigidly fixed to the pivotable frame, and in extreme cases this may lead to the frame no longer being able to move. If a plurality of cables in the form of a bundle are routed from the rear face of the housing in the direction of the frame and fixed to the frame, the above problems are intensified since the cables which are combined to form one bundle adhere to one another in a frictionally engaging manner on account of the properties of the cable casing and therefore can form a rigid connection. Consequently, it is problematical to route the cables from the rear face of the housing of the distribution cabinet in the direction of the pivotable frame in the case of distribution cabinets for optical fibers which are known from the prior art.

Against this background, the present invention is based on the problem of providing a novel distribution cabinet for optical fibers.

This problem is solved by a distribution cabinet for optical fibers including the features of the present invention shown and described herein. In the distribution cabinet for optical fibers according to the invention, at least one holding device for the cables is attached to the frame which is mounted such that it can pivot, it being possible to fix the cables to the each holding device, and the each holding device being formed such that it can pivot firstly together with the frame in relation to the housing and secondly in relation to the frame. The mechanical load on the cables when the frame is pivoted is minimized on account of the ability of the each holding device to pivot in relation to the likewise pivotable frame. The difficulties known from the prior art are [thus] overcome.

According to one preferred embodiment of the invention, the each holding device can be pivoted in relation to the frame in such a way that in each position of the frame the holding device is oriented toward the rear face of the housing. In this case, the each holding device is oriented toward a region of the rear face or rear wall of the housing in which the cables which can be routed into and/or out of the distribution cabinet are routed and/or attached.

The holding device is preferably attached to the rear face of the housing by means of at least one traction device in each case, to be precise in the region or in the vicinity of the region in which the cables which can be routed into and/or out of the distribution cabinet are routed and/or attached. The traction device is relatively relaxed in the position in which the relative distance between the respective holding device and the region of the rear face of the housing is the shortest, with the each traction device being tensioned as the relative distance increases.

BRIEF DESCRIPTION OF THE DRAWINGS

Preferred embodiments of the invention can be found in the following detailed description. One exemplary embodiment is explained in greater detail with reference to the drawing figures, in which:

FIG. 1: shows a highly schematic plan view of a distribution cabinet for optical fibers according to the invention, with a pivoting frame in the starting position, FIG. 2: shows a highly schematic plan view of the distribution cabinet for optical fibers according to the invention from FIG. 1, with a pivoting frame pivoted out of the distribution cabinet, FIG. 4: shows a perspective side view of a detail of the distribution cabinet for optical fibers according to the invention.

DETAILED DESCRIPTION OF THE INVENTION

Figure 3:
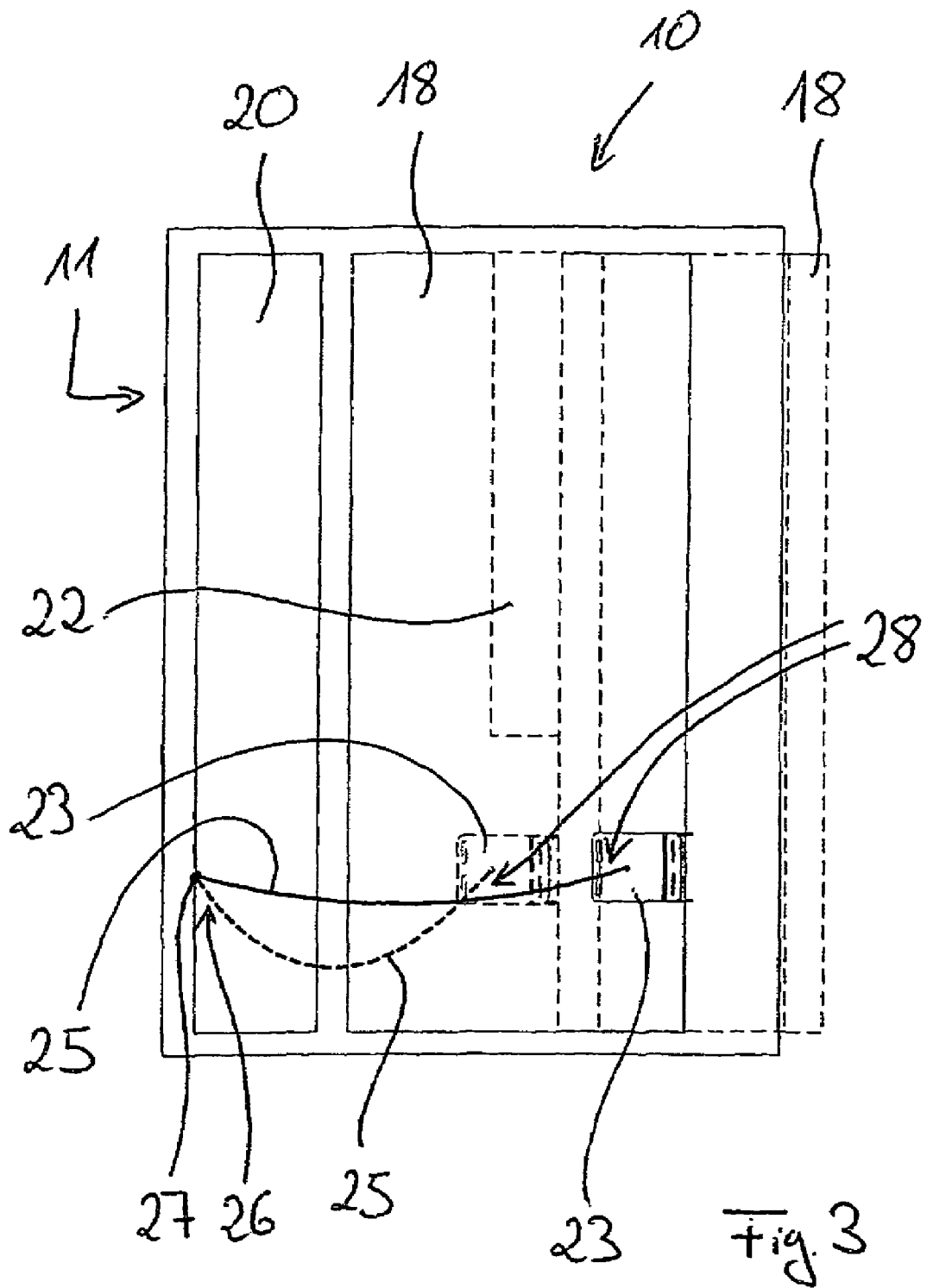
FIG. 3: shows a highly schematic side view of the distribution cabinet for optical fibers according to the invention from FIGS. 1 and 2, with the pivoting frame shown in the starting position and in the pivoted-out position.

In the text which follows, the present invention is described in greater detail with reference to FIGS. 1 to 4. FIGS. 1 and 2 show a plan view of the distribution cabinet for optical fibers according to the invention, while FIG. 3 shows a front view of the same.

A distribution cabinet 10 for optical fibers has a housing 11 which is formed, inter alia, by two struts 12, 13 in the region of a rear wall or rear face 14 of the distribution cabinet for optical fibers and by two struts 15, 16 in the region of a front wall or front face 17 thereof. A pivotable frame 18 is arranged in the distribution cabinet 10 for optical fibers, it being possible to pivot the frame 18 in relation to the fixed housing 11 about a pivot axis 19. FIG. 1 shows the distribution cabinet for optical fibers with a frame 18 pivoted into the housing 11, and FIG. 2 shows the same with a frame 18 pivoted out of the housing 11. It follows directly from this that the front face of assemblies which are positioned in the frame can be accessed in the position of the pivotable frame 18 shown in FIG. 1, whereas the rear face of these assemblies can be accessed in the position of the frame 18 which is illustrated in FIG. 2.

Adjacent to the rear face 14, cables (not illustrated in detail) are routed into and optionally out of the distribution cabinet 10 for optical fibers from an upper face and/or a lower face of the distribution cabinet 10. In this case, the cables which can be routed into and/or out of the distribution cabinet 10 for optical fibers are routed and optionally attached in a region 20 of the rear wall 14. Starting from this region 20, the cables are then fed to the pivotable frame 18 in order to ultimately feed the cables to assemblies, which are arranged in the frame 18, for connecting the optical fibers which are routed in the cables.

In the exemplary embodiment shown, the cables are fed to one end 21 of the pivotable frame 18 from the region 20, with a guide rail 22 being rigidly connected to the frame 18 in the region of this end 21. The cables can be routed in the vertical direction on the pivotable frame 18 along the guide rail 22. For the purposes of the present invention, the cables are not attached directly to the guide rail 22 but rather to a holding device 23, with the holding device 23 being formed such that it can pivot firstly together with the frame 18 in relation to the housing 11 and secondly can likewise pivot in relation to the frame 18. The holding device 23 is accordingly not rigidly fixed to the pivotable frame 18 but engages thereon by means of a rotary bearing or hinge 24. In this case, the rotary axis of the hinge 24 runs just like the pivot axis 19 of the frame 18 in an approximately vertical direction and therefore approximately parallel to the latter. As can be seen in FIG. 3, the guide rail 22 which is rigidly connected to the frame 18 does not extend over the entire vertical height of the pivotable frame 18 but only in the region of the top two thirds of the vertical height of the frame 18. The holding device 23 is positioned below the guide rail 22. It should be noted that FIG. 3 shows the frame 18 in two different positions. The position according to FIG. 1 is shown by solid lines in FIG. 3, and the position according to FIG. 2 is shown by dashed lines in FIG. 3.

For the purposes of the invention, the holding device 23 is formed such that it can pivot in relation to the frame 18 in such a way that the holding device 23 is oriented toward the rear face 14 of the distribution cabinet 10 in each position of the pivotable frame 18—be it in the position pivoted into the housing 11 illustrated in FIG. 1 or in the position pivoted out of the housing 11 illustrated in FIG. 2. It can be seen in FIGS. 1 and 2 that the holding device 23 is always oriented toward the region 20 in which the cables which can be routed into and/or out of the distribution cabinet 10 are routed and/or attached. It can furthermore be seen in FIG. 2 that the holding device 23 is oriented toward the region 20 in such a way that an angular position of the holding device 23 with respect to the rear wall 14 of the housing 11 remains approximately unchanged in each position of the frame 18. Therefore, in FIG. 1, in which the frame 18 is fully pivoted into the housing 11, the angular position between the holding device 23 and the rear face 14 of the housing 11 is approximately 15°. If, however, the frame 18 is pivoted about its pivot axis 19 completely out of the housing 11—the frame 18 is typically pivoted about its pivot axis 19 through 135° for this purpose—the angular position between the holding device 23 and the rear face 14 of the distribution cabinet 10 changes only slightly. In FIG. 2, this angular position is approximately 25°. Therefore, while the guide rail 22 which is firmly connected to the pivoting frame 18 is pivoted through 1350 when the pivoting frame 18 moves from the position illustrated in FIG. 1 to the position illustrated in FIG. 2, the angular position between the holding device 23 and the rear face 14 of the distribution cabinet 10 changes only by approximately 10°. It follows directly from this that the cables which are attached to the holding device 23 are only subject to a low mechanical load despite the large pivoting movement of the frame 18, and are therefore handled particularly carefully in the distribution cabinet 10 for optical fibers according to the invention.

In order to assist the movement of the holding device 23 when the frame 18 is pivoted, or to assist the orientation of the holding device 23 toward the rear face 14 of the housing 11 in a controlled manner, the holding device 23 is connected to the rear face 14, specifically to the region 20 of the rear face 14, by means of a traction device 25. The traction device 25 is attached by a first end 26 to a fixed point 27 of the region 20 of the rear face 14 and by a second end 28 to the holding device 23. The traction device 25 may be in the form of a traction cord or a tension spring. The traction force in the traction device 25 is set such that the traction device 25 is relatively relaxed when there is an extremely small distance between the holding device 23 and the stationary point 27 or the region 20. When the distance between the fixed point 27 and the holding device 23 increases, the traction device 25 is increasingly tensioned. This can be seen in FIG. 3 in particular. The traction device is tensioned by the weight of the cables when the traction device 25 is in the form of a traction cord.

Preference is given to a refinement of the traction device in which there are two traction cords, with an accommodation depression which is made of plastic film being formed between the two traction cords, and it being possible to insert the cables into this accommodation depression. In the position of the frame 18 shown in FIG. 1, the two traction cords and the accommodation depression are tensioned in this case and the cables which are inserted in the accommodation depression are raised. The traction cords are tensioned by the weight of the cables which are inserted in the accommodation depression. When the frame is pivoted into the position from FIG. 2, the cables are lowered with the accommodation depression, with the weight of the cables being transmitted as traction force by means of the traction cords to the holding device which is mounted on the frame such that it can pivot.

In the above-described, preferred exemplary embodiment of the distribution cabinet 10 according to the invention, the movement of the cables when the frame 18 is pivoted is divided into two main components or zones by the holding device 23 which is formed such that it can pivot in relation to the pivotable frame 18. The first main movement which can be executed by the cables is determined by the extent to which the cables hang freely between the region 20 of the rear face 14 of the distribution cabinet 10 and the holding device 23 to which the cables are attached. The cables are raised when the frame 18 is in the position pivoted into the distribution cabinet 10, which position is illustrated in FIG. 1, and in contrast are lowered when said frame is pivoted into the position which is shown in FIG. 2. This follows directly from FIG. 3. In addition to this movement component, the cables execute a relative movement between the holding device 23 and the guide rail 22 which is arranged above the holding device 23. Whereas the guide rail 22 is rigidly connected to the pivotable frame, the holding device 23 can be pivoted in relation to the frame 18. In the region between the holding device 23 and the guide rail 22, the cables accordingly execute a slight bending movement with a little torsion.

FIG. 4 shows a preferred embodiment of the holding device 23. The cross section of the holding device 23 shown in FIG. 4 is designed in the approximate shape of the alphabet letter "E". The holding device 23 thus has a plate-like base element 29, with three holding elements 30 which are at an angle of approximately 90° in relation to the base element 29 being provided in the exemplary embodiment from FIG. 4. Together with the base element 29, the holding elements 30 bound two accommodation spaces 31 and 32 which are formed to be open in the direction of the rear face 14 of the distribution cabinet 10 for optical fibers. This can be seen in FIGS. 1 and 2 in particular. The formation of the two accommodation spaces 31 and 32 makes it possible to separate incoming and outgoing cables from one another. This facilitates possible jumpering work on the cables.

As can be seen in FIG. 4, openings 33 are made in the holding elements 30 and in the base element 29. Cable ties or touch-and-close fastening strips, for example, can be drawn through the openings 33 in order to fix the cables, which are arranged in the accommodation spaces 31 and 32, in the holding device 23.

FIG. 4 also shows the hinge 24 which makes possible the relative movement between the holding device 23 and the frame 18. The hinge 24 engages on the base element 29. The holding device 23 can be attached to the pivotable frame 18 by means of an attachment element 34 which likewise engages on the hinge 24.

In the exemplary embodiment shown, a holding device 23 is attached to the pivotable frame 18. As already mentioned, this holding device 23 engages on the end 21 of the frame 18. In contrast to the exemplary embodiment shown, it is also possible to attach the holding device 23 to the frame 18 at an end 35 of said frame which is opposite the end 21. Furthermore, it is also possible to arrange a holding device 23 at each of the two ends 21 and 35. It is also possible, within the scope of the invention, to arrange a holding device 23 both on the frame 18 and on the rear wall 14 of the distribution cabinet 10 in each case.

The distribution cabinet for optical fibers according to the invention allows the cables which contain the optical glass fibers or optical fibers to be handled particularly carefully, with the frame which is arranged in the distribution cabinet such that it can pivot having an unlimited freedom of movement.

That which is claimed:

1. A distribution cabinet for optical fibers, having a housing and a frame mounted in the housing that it can pivot, the optical fibers being routed to the frame from a rear face of the housing and away from said frame in the direction of the rear face, and assemblies for connecting the optical fibers being attached to the frame, wherein at least one holding device for the optical fibers is attached to the frame with the holding device being formed such that it can pivot firstly together with the frame in relation to the housing and secondly in relation to the frame, wherein the holding device is attached to a region of the rear face by at least one traction device and in which region the optical fibers are routed into and out of the distribution cabinet, the traction device being relatively relaxed in a position in which a relative distance between the holding device and the region of the rear face is relatively shortest with the traction device being tensioned as the relative distance increases.

2. The distribution cabinet for optical fibers as claimed in claim 1, wherein the holding device can be pivoted in relation to the frame in such a way that in each position of the frame the holding device is oriented toward the rear face of the housing.

3. The distribution cabinet for optical fibers as claimed in claim 1, wherein the holding device can be pivoted in relation to the frame in such a way that in each position of the frame the holding device is oriented toward the rear face of the housing in approximately the same angular position.

4. The distribution cabinet for optical fibers as claimed in claim 1, wherein in each position of the frame, the holding device is oriented toward a region of the rear face of the housing in which the optical fibers are routed.

5. The distribution cabinet for optical fibers as claimed in claim 1, wherein the holding device is attached to the frame, such that it can pivot.

6. The distribution cabinet for optical fibers as claimed in claim 1, wherein the holding device has a base element and a plurality of holding elements which are at an angle in relation to the base element and run approximately parallel to one another, the holding elements forming two accommodation spaces, which are open in the direction of the rear face of the housing, for receiving optical fibers routed from the rear face of the housing to the respective holding device and away from said rear face.

7. The distribution cabinet for optical fibers as claimed in claim 1, wherein the traction device is attached by a first end to the rear face of the housing and by a second end to the respective holding device.

8. The distribution cabinet for optical fibers as claimed in claim 7, wherein the traction device is attached by the first end to the region of the rear face of the housing, in which the optical fibers are routed into and out of the distribution cabinet.

9. A distribution cabinet having assemblies for connecting optical fibers, the distribution cabinet comprising:
   a housing having a rear face and an opposing front face;
   a frame pivotally mounted in the housing, the optical fibers being routed from the rear face in a first direction of the frame;
   a holding device defining an accommodation space therein for the optical fibers, the holding device being attached to the frame with the accommodation space oriented in a second direction of the rear face, the holding device being configured to pivot with the frame relative to the housing or to the frame, the accommodation space remaining oriented In the second direction of the rear face upon pivoting of the frame such that a load on the optical fibers is minimized; and
   a traction device for attaching the holding device to a region of the rear face, the optical fibers being routed into and out of the distribution cabinet proximate the region of the rear face, the traction device being relaxed in a first state and defining a first distance between the holding device and the region of the rear face, the traction device being tensioned in a second state and defining a second distance greater than the first distance.

10. The distribution cabinet for optical fibers as in claim 9, wherein holding device includes a hinge disposed between the accommodation space and the frame, the hinge being configured to maintain the accommodation space oriented in the second direction of the rear face upon pivoting of the frame.

11. The distribution cabinet for optical fibers as in claim 9, wherein the holding device includes an E shaped member.

12. The distribution cabinet for optical fibers as in claim 9, wherein the traction device is one of a spring or a cord, the traction device being configured to urge the holding device toward the region of the rear face in the second state.

* * * * *